United States Patent [19]

Shigeta et al.

[11] Patent Number: 5,264,274

[45] Date of Patent: Nov. 23, 1993

[54] THERMOPLASTIC COMPOSITE MATERIAL HAVING IMPROVED TOUGHNESS AND METHOD OF PRODUCING SAME

[75] Inventors: Hiromasa Shigeta, Shiki; Masaru Iguchi, Kawaguchi; Toshinobu Hata, Tokyo, all of Japan

[73] Assignee: Honda Giken Kogyo Kabushiki Kaisha, Tokyo, Japan

[21] Appl. No.: 805,629

[22] Filed: Dec. 12, 1991

[30] Foreign Application Priority Data

Feb. 4, 1991 [JP] Japan .................................... 035654
Feb. 12, 1991 [JP] Japan .................................... 3-040941

[51] Int. Cl.$^5$ .................... D04H 1/08; D04H 1/16; B32B 5/16
[52] U.S. Cl. .................... 428/284; 428/280; 428/282; 428/290; 428/402
[58] Field of Search ............... 428/280, 282, 290, 284, 428/402

[56] References Cited

U.S. PATENT DOCUMENTS 5,019,450  5/1991  Cogswell et al. .................... 428/402

Primary Examiner—George F. Lesmes
Assistant Examiner—Kathryne E. Shelborne
Attorney, Agent, or Firm—Birch, Stewart, Kolasch & Birch

[57] ABSTRACT

The composite material having improved toughness is produced by preparing a laminate from reinforcing fibers and a thermoplastic resin; heating the laminate at a temperature higher than a melting point of the thermoplastic resin under pressure; quenching the composite material at an initial cooling rate of 100° C./min or more, thereby providing the PEEK in the resulting composite material with a degree of crystallization equal to or lower than 75% of the maximum degree of crystallization of the thermoplastic resin.

5 Claims, 2 Drawing Sheets

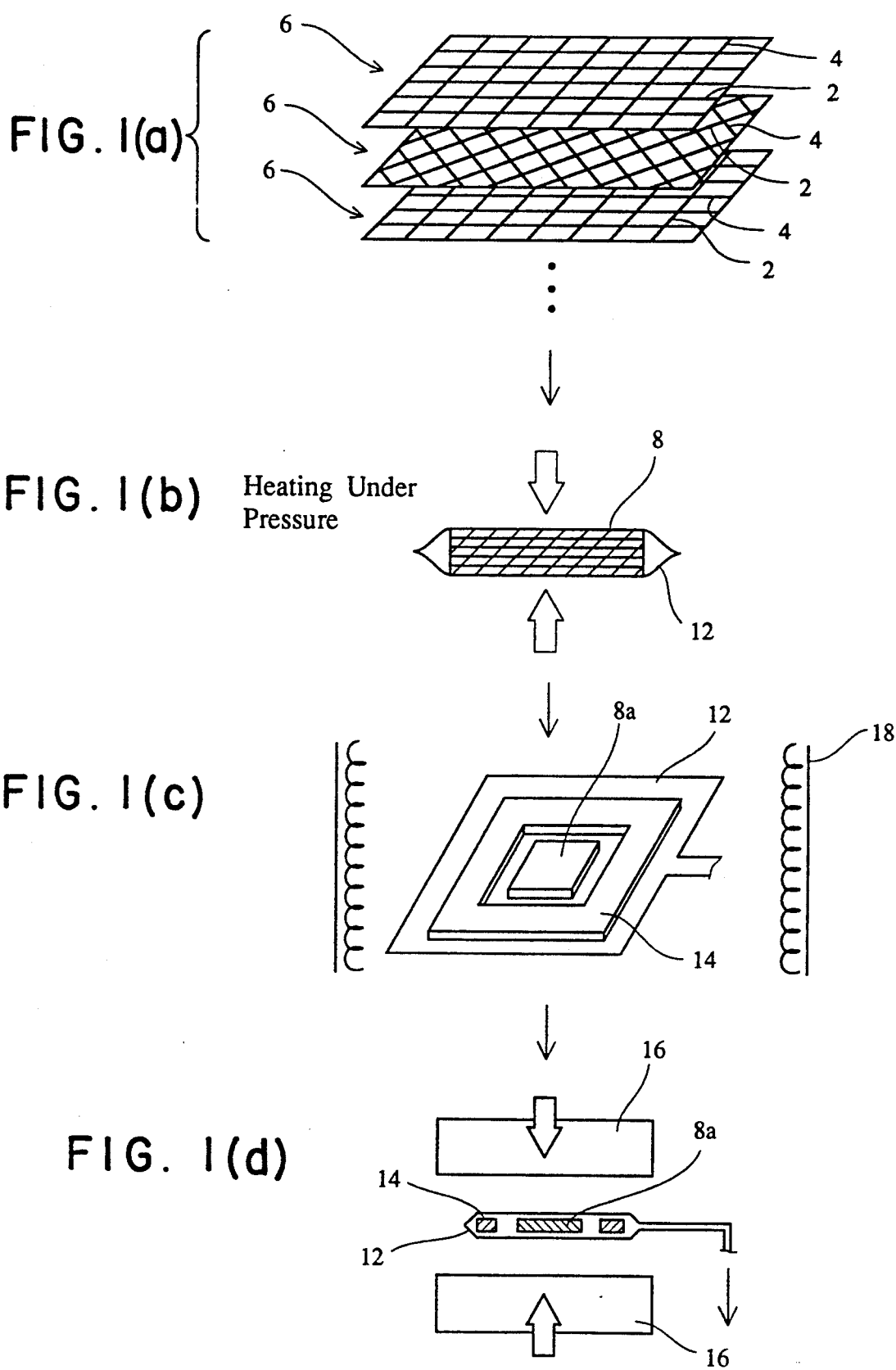

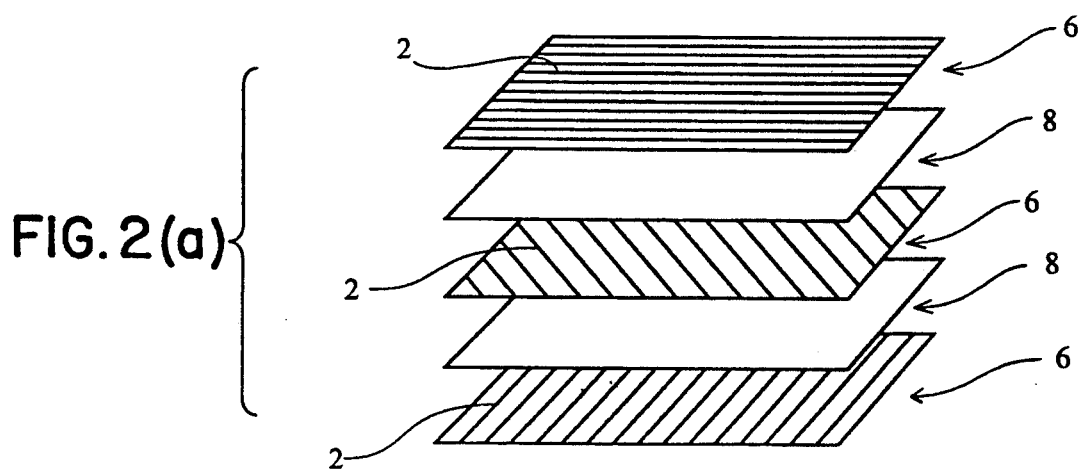
FIG. 2(a)
FIG. 2(b) Heating Under Pressure
FIG. 2(c) Cooling
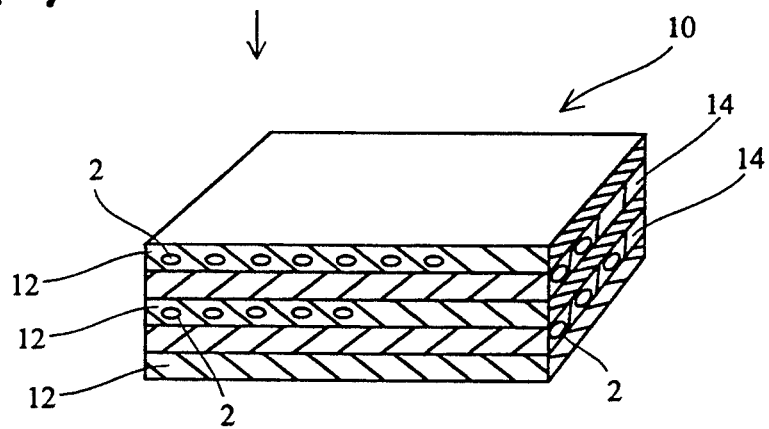
FIG. 3
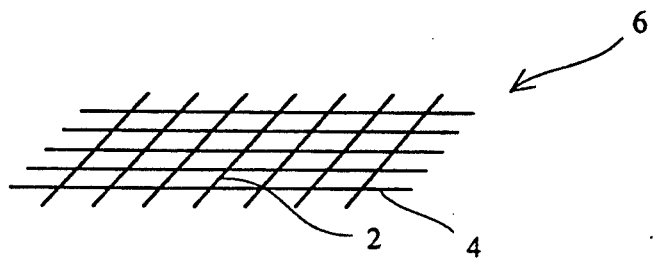

THERMOPLASTIC COMPOSITE MATERIAL HAVING IMPROVED TOUGHNESS AND METHOD OF PRODUCING SAME

BACKGROUND OF THE INVENTION

The present invention relates to a thermoplastic composite material consisting of reinforcing fibers and a thermoplastic resin and having an improved toughness, and a method of producing such a composite material.

Various composite materials consisting of reinforcing fibers such as carbon fibers and matrix phases of thermoplastic resins are used in various fields recently. Since those containing thermoplastic resins as matrix resins are easily formed, they are used widely for various home electric appliances, machine parts, automobile parts, structural materials, etc. Particularly, since poly(ether ether ketone) (hereinafter referred to as "PEEK"), one of the thermoplastic resins, shows excellent mechanical strength, elongation, damage tolerance, etc., composite materials containing the PEEK as a matrix resin are expected to be used for various machine parts including automobile parts, structural materials, etc.

With respect to the reinforcing fiber layer, there is provided a sheet consisting of reinforcing fibers such as carbon fibers and fibers such as PEEK fibers. When this sheet is used for composite materials, it is laminated in a plural number, and compressed while heating so that the PEEK is melted into an integral phase.

The composite materials constituted by reinforcing fibers and PEEK matrices are somewhat poor in impact resistance (toughness), in spite of having good mechanical strength. In order to improve the toughness of the composite materials consisting of the reinforcing fibers and the PEEK, one means is to use PEEK having a high molecular weight. However, since the high-molecular weight PEEK shows a high melt viscosity, molten PEEK does not sufficiently enter into the reinforcing fibers. If a low-molecular weight PEEK is used, the resulting composite material fails to show sufficiently improved toughness as compared with the use of the high-molecular weight PEEK. Nevertheless, in conventional reinforcing fiber/PEEK woven sheets, low-molecular weight PEEK fibers are used, to ensure that the reinforcing fiber sheets are well impregnated with the PEEK. Accordingly, composite materials having excellent mechanical properties such as toughness are desired.

OBJECT AND SUMMARY OF THE INVENTION

An object of the present invention, therefore, is to provide a thermoplastic composite material having improved toughness.

Another object of the present invention is to provide a method of producing such a thermoplastic composite material.

As a result of intense research in view of the above objects, the present inventors have found that by controlling the degree of crystallization of the thermoplastic resin in the composite material lower than a certain level, the composite material can show extremely improved impact resistance, interlayer energy release coefficient, etc., whereby the composite material is provided with improved toughness. Also, the inventors have found that by combining first layers consisting of reinforcing fibers and PEEK having a low molecular weight with second layers consisting of PEEK having a high molecular weight to form a laminate for the composite material, good impregnation of the PEEK into the reinforcing fibers can be achieved, leading to improved mechanical strength and toughness. The present invention has been completed based on these findings.

The thermoplastic composite material having improved toughness according to one embodiment of the present invention contains a thermoplastic resin having a degree of crystallization less than or equal to 75% of the maximum degree of crystallinity of the resin.

The method of producing a composite material having improved toughness according to the above embodiment of the present invention comprises the steps of preparing a laminate for the composite material from reinforcing fibers and a thermoplastic resin; heating the laminate at a temperature higher than a melting point of the thermoplastic resin under pressure; quenching the composite material at an initial cooling rate of 100° C. or more, thereby providing the PEEK in the resulting composite material with a degree of crystallization corresponding to 75% or less of the maximum degree of crystallization of the thermoplastic resin.

The thermoplastic composite material having improved toughness according to another embodiment of the present invention comprises a laminate constituted by first layers consisting of reinforcing fibers and poly(ether ether ketone) fibers having a low molecular weight, and second layers consisting of poly(ether ether ketone) having a high molecular weight, the laminate being compressed while heating.

A method of producing a composite material having improved toughness according to the above embodiment of the present invention comprises the steps of preparing a laminate of first layers consisting of reinforcing fibers and poly(ether ether ketone) fibers having a low molecular weight, and second layers consisting of poly(ether ether ketone) having a high molecular weight; heating the laminate under pressure so as to melt both of the low-molecular weight poly(ether ether ketone) fibers and the high-molecular weight poly(ether ether ketone) to make them integral with each other in the composite material.

BRIEF DESCRIPTION OF THE DRAWINGS

FIG. 1(a–d) are schematic views showing the process of producing a composite material according to one embodiment of the present invention;

FIG. 2(a–c) are schematic views showing the process of producing a composite material according to another embodiment of the present invention; and FIG. 3 is a perspective view schematically showing the first layers used in another embodiment of the present invention.

DETAILED DESCRIPTION OF THE INVENTION

Thermoplastic Resins

Thermoplastic resins usable in the present invention are crystalline thermoplastic resins such as PEEK, polyamides such as nylon, polyesters such as polyethylene telephthalate and polybutylene telephthalate, polyacetates, polyphenylene sulfides, polyether ketones, etc. Among them, PEEK is preferable because of high mechanical strength, impact resistance, etc.

In the composite material of the first embodiment containing one type of PEEK, the molecular weight of the PEEK may be $6.5 \times 10^4$–$8.3 \times 10^4$.

In the composite material of the second embodiment containing two types of PEEKs (low-molecular weight PEEK and high-molecular weight PEEK), the molecular weights of both PEEKs are as described below.

Reinforcing Fibers

The composite material of the present invention contains reinforcing fibers as well as the thermoplastic resin. The reinforcing fibers may be long fibers of carbon fibers, glass fibers, boron fibers and so on. Incidentally, when the composite material contains a matrix resin excluding PEEK and polyether ketone, aramide fibers can be used besides the above reinforcing fibers. With respect to a fiber diameter, it is desirable that it is in the range of 3-200 μm.

Reinforcing Fibers/Thermoplastic Resin Sheet

Woven fabrics, such as plain weave fabrics, satin weave fabrics, twill weave fabrics and so on, which consist of thermoplastic resin fibers and reinforcing fibers, are used as sheets for the composite material of thermoplastic resins and reinforcing fibers. Combinations of thermoplastic films and reinforcing fibers may also be used. Besides, thermoplastic films or powders can be combined with the above sheets of thermoplastic fibers and reinforcing fibers.

First Production Method of Composite Material

The method of producing the composite material in the present invention will be explained below by an example of the composite material of a thermoplastic resin and reinforcing fibers referring to the drawings, without intention of limiting the scope of the present invention.

First, as illustrated in FIG. 1(a), sheets consisting of thermoplastic resins and reinforcing fibers are laid up (step (a)). In this example, plain weave fabric sheets 6, which are woven from thermoplastic resin fibers 4 and reinforcing fibers 2, are used. Each sheet is laid up substantially equally in any direction (in quasi-isotropic manner).

Then, heat and pressure are applied to the laminate obtained by the process shown in FIG. 1(a) (step (b)). This step may be carried out in an autoclave (not shown). The pressure applied to the laminate in the step (b) varies to some extent depending on the thermoplastic resin used, but when PEEK is used, suitable pressure is in the range of 6-20 kg/cm². The heat applied to the laminate is desirably high enough for the thermoplastic resin to be melted and sufficiently penetrate into the reinforcing fibers. If PEEK is used, the temperature is desirably in the range of 340°-400° C. Under these conditions, the laminate is heated under pressure to provide the laminate with a desired shape.

After impregnating the reinforcing fibers with the thermoplastic resin by heating under pressure in the step (b), the composite material is quenched while the thermoplastic resin in the composite material is still in a molten state, in order to control the degree of crystallization of the thermoplastic resin to a low level. However, it is very difficult in practice to quench the composite material in the autoclave. Accordingly, it is a practical procedure to take the composite material out of the autoclave, reheat it by an electric oven to remelt the thermoplastic resin in the composite material, and subject the composite material to cold pressing by means of a mold whose temperature is controlled to carry out quenching. Explanation will be made on this method.

The composite material 8a obtained in the step (b) is placed in an electric oven 18 or a similar apparatus to heat it at a temperature at which the thermoplastic resin in the composite material is melted (step (c)). At this time, it is recommended that the composite material 8a is enclosed by a frame 14, and introduced into a bag 12 of a heat-resistant film such as a polyimide film, etc., and that the composite material is heated while evacuating the bag 12 by a vacuum pump. This procedure avoids the deformation of the composite material.

The heating temperature is preferably 10°-60° C. higher than the melting point of the thermoplastic resin. In the case of PEEK as the thermoplastic resin, the heating temperature is preferably in the range of 340°-400° C., and more preferably about 400° C.

The heating time during which the composite material is kept at the above temperature should be long enough to melt the thermoplastic resin in a center portion of the composite material. Specifically, the heating time is desirably in the range of 10-30 minutes.

In the step (d), the composite material whose thermoplastic resin is still in a molten state is quenched while exerting pressure. This operation can be carried out by using metal molds such as aluminum blocks 16, etc., inside of which a cooling medium such as water or oil flows. Preferred pressure applied to the composite material is in the range of 10-30 kg/cm².

By the quenching in the step (d), the degree of crystallinity of the thermoplastic resin in the finished composite material is controlled less than or equal to 75% of the maximum degree of crystallinity of the thermoplastic resin. To achieve this level of degree of crystallization, the initial cooling rate of the composite material in the quenching step (d) should be higher than or equal to 100° C./minute. Although this value varies depending on the thermoplastic resins used and the shapes of composite materials, the initial cooling rate less than 100° C./minute leads to too high a degree of crystallization of the thermoplastic resin, resulting in the composite material with poor toughness.

The term "initial cooling rate" used herein means the initial cooling rate measured between a temperature at which the PEEK is in a molten state and the glass transition temperature of the PEEK, in a portion of the composite material where the cooling rate is the lowest. The lowest cooling rate is usually observed in a center portion of the composite material. The term "degree of crystallinity" used herein means the degree of crystallinity in the center portion of the composite material, in which the cooling rate is the smallest, so that the degree of crystallinity is the highest. Accordingly, the degree of crystallinity described herein is the highest one in the entire composite material. Incidentally, the degree of crystallinity is obtained by DSC (differential scanning calorimetry).

Particularly when PEEK is used, the initial cooling rate is preferably higher or equal to 130° C./min. Under this condition, the degree of crystallinity is controlled less than or equal to 34%, and it renders the composite material with increased toughness. The preferred degree of crystallinity of the PEEK resin is 26-34%.

An alternative way to improve the toughness of the composite material will be explained below.

In FIGS. 2 and 3, first layers 6 each consisting of reinforcing fibers 2 and PEEK fibers 4 having a low molecular weight and second layers 8 consisting of poly(ether ether ketone) powder, film, fabric, etc. are used. The first layer may be the same as the above described reinforcing fibers/thermoplastic resin sheet, and the reinforcing fibers may also be the same as described above.

The low-molecular weight PEEK fibers 4 are made of PEEK having a weight-average molecular weight of about $6.5 \times 10^4$–$8.3 \times 10^4$, a relative molecular weight obtained based on the molecular weight of polystyrene. By using the PEEK fibers having such a low molecular weight, the low-molecular weight PEEK resin can well penetrate into the reinforcing fibers in the process of forming under heating and compressing conditions, providing the resulting composite material with improved mechanical strength. Incidentally, the low-molecular weight PEEK fibers may have a diameter of 5–200 $\mu$m.

The second layers which are to be laminated with the first layers alternately are made of PEEK having a higher molecular weight than that of the PEEK in the first layers. This high-molecular weight PEEK has a weight-average molecular weight of about $9.0 \times 10^4$–$9.4 \times 10^4$. When the PEEK in the second layers has a weight-average molecular weight lower than the above level, the PEEK shows too high a melt viscosity, so that the composite material does not show good formability.

The second layers consisting of the high-molecular weight PEEK are desirably in the form of powder, film, woven fabric, non-woven fabric, etc., and among them, powder or film is preferable.

When the PEEK in the second layers is in the form of powder, it desirably has an average diameter of 0.5 mm or less. When the average diameter of the PEEK powder is larger than 0.5 mm, the formability of the composite material is poor, and the PEEK resin phase in the composite material is less likely to be uniform, resulting in poor mechanical strength.

When the PEEK in the second layers is in the form of film, it desirably has a thickness of 3–35 $\mu$m. When the thickness of the PEEK film is smaller than 3 $\mu$m, the improvement of the toughness cannot be sufficiently achieved. On the other hand, when the thickness of the PEEK film is larger than 35 $\mu$m, the formability of the composite material is poor.

When the PEEK in the second layers is in the form of fabric, it desirably is constituted by strands consisting of PEEK fibers having an average diameter of 5–200 $\mu$m, preferably about 30 $\mu$m in a density of 4–40 strands per 1-mm width.

Second Production Method of Composite Material

The method of producing the composite material by using the first and second layers will be explained below.

First, as shown in FIG. 2, the first sheets 6 for first layers are laminated with the second sheets 8 for second layers. In this example, the first sheets 6 and the second sheets 8 consisting of PEEK films are laminated alternately. However, this configuration is not necessarily indispensable, and the PEEK films may be inserted between every one or more of the first layers depending on the molecular weight of the PEEK and the desired toughness of the composite material. In this example, each sheet is laid up substantially equally in any direction (in a pseudo-isotropic manner). Also, by laminating the second layers 8 uniformly on the surfaces of the first layers 6, the resulting composite material shows uniform interfacial properties.

Then, heat and pressure are applied to the laminate obtained by the process shown in FIG. 2($a$) (step (b)). The pressure applied to the laminate in the step (b) is preferably in the range of 6–20 kg/cm$^2$. The heat applied to the laminate is desirably high enough for the PEEK resin to be melted and penetrate into the reinforcing fibers. Specifically, the heating temperature is desirably in the range of 340°–400° C. Under these conditions, the laminate is heated under pressure to provide the laminate with a desired shape.

By heating in the step (b), the PEEK resin in the laminate is melted and made integral while penetrating into the reinforcing fibers. By cooling (step (c)), the desired composite material 10 is obtained. In the resulting composite material, the reinforcing fibers 2 are surrounded by the low-molecular weight PEEK 12, and the high-molecular weight PEEK 14 exists between the adjacent first layers.

Since the toughness of the composite material may vary depending on the degree of crystallization of the PEEK resin, it is desirable to control the cooling rate of the composite material in the cooling step (c), in order to adjust the degree of crystallization of the PEEK resin in the resulting composite material 10 to a proper range. As a result of experiments, the inventors have found that when the degree of crystallization of the PEEK resin is 34% or less, remarkable increase in the toughness can be achieved. Better results can be obtained by controlling the degree of crystallization of the PEEK resin to 29–34%.

As in the first production method, the cooling (quenching) can be carried out by using metal molds such as aluminum blocks, etc., inside of which a cooling medium such as water or oil flows, or rolls whose temperature is controlled. To achieve the above degree of crystallization (34% or less), the initial cooling rate of the composite material should be higher than or equal to 100° C./minute, in the cooling process between the molten state and the glass transition temperature of the PEEK. Below the glass transition temperature of the PEEK, the composite material may be cooled spontaneously.

The composite material obtained by the above method shows excellent mechanical strength and toughness, because it contains the low-molecular weight PEEK resin portion 12 well penetrating into the reinforcing fibers 2, and the high-molecular weight PEEK resin portion 14 disposed between the reinforcing fibers/low-molecular weight PEEK resin layers.

Incidentally, the method of this embodiment may be modified without deviating from the scope of the present invention. For instance, the laminate may be heated under pressure such that the degree of crystallization of the PEEK resin becomes larger than 34%, and then the composite material may be reheated under pressure in a temperature-controllable mold, so that the degree of crystallization of the PEEK resin in the composite material becomes 34% or less.

Although explanation has been made on the method of producing the composite material referring to FIGS. 1–3, the present invention is not limited thereto, and various modifications can be made. For example, the quenching process of the composite material with metal molds can be divided into two stages. In this modification, the cooling rate is adequately controlled, which provides desired properties to the thermoplastic resin in the composite material. Incidentally, the composite material may be cooled spontaneously in a temperature region lower than the glass transition temperature $T_g$ of the thermoplastic resin.

The present invention will be explained in further detail by the following Examples.

EXAMPLE 1

40 plain weave fabric sheets consisting of carbon fibers having an average diameter of 7 μm and PEEK fibers having a weight-average molecular weight of $7.4 \times 10^4$ and an average diameter of 30 μm were laid up. The resulting laminate was enclosed in a polyimide film bag, and introduced into an autoclave to compress it at 400° C. and 14 kg/cm². Thus, the composite material was obtained.

The composite material kept in the polyimide film bag was placed in an electric oven, which was heated at 400° C., while evacuating the film bag for 10 minutes as shown in FIG. 1(c). Thus, the PEEK in the composite material was melted.

The film bag was then taken out of the electric oven and subjected to cold pressing with aluminum blocks, which was water-cooled at 30° C., at the pressure of 14 kg/cm². The cooling rate of the composite material in the cold pressing process was monitored with a thermocouple.

The degree of crystallinity of the PEEK resin in the composite material was measured by DSC. Incidentally, the degree of crystallinity of the PEEK resin was a value averaged in the thickness direction. The results are shown in Table 1.

Each composite material was cut to a size of 100 mm × 100 mm to obtain a specimen, and compressive properties (CAI strength and CAI strain at break point) of each specimen were measured after impact in accordance with the NASA testing methods. Specifically, an energy of 26.7 J was strikingly applied to each specimen by dropping a steel ball from a certain height, and the elected specimen was compressed vertically (in the longitudinal or width direction) to measure the strength and strain at the break point of the composite material. The results of the measurements of CAI strength and CAI strain at break point are shown in Table 2.

EXAMPLE 2

A laminate was produced in the same procedures as in Example 1. The laminate was heated under pressure in an autoclave, thereby producing an integral composite material.

Then, the composite material in a polyimide film bag was placed in an electric oven at 400° C. for 10 minutes to melt the PEEK in the composite material in the same manner as in Example 1.

The film bag was taken out of the electric oven, and then the composite material was compressed with aluminum blocks, which was kept at 160° C. by an electric heater, at the pressure of 14 kg/cm² for 10 minutes. After that, the heater was turned off, and the aluminum blocks were cooled down to 30° C. with cooling water.

The degree of crystallinity of the PEEK in the resulting composite material was measured in the same manner as in Example 1. The results are shown in Table 1.

The CAI strength and CAI strain of the composite material at break point were measured in the same manner as in Example 1. The results are shown in Table 2.

COMPARATIVE EXAMPLE 1

A laminate was produced in the same procedures as in Example 1. The laminate was heated under pressure in an autoclave in the same manner as in Example 1, thereby melting the PEEK together to produce an integral composite material. Incidentally, the composite material was spontaneously cooled down in the autoclave. In this cooling process, the initial cooling rate was 10° C./minute.

The degree of crystallinity of the PEEK in the resulting composite material and the CAI strength and CAI strain of the composite material at break point were measured in the same manner as in Example 1. The results are shown in Tables 1 and 2.

TABLE 1

| Example No. | Cooling Condition | Initial Cooling Rate (°C./min.) | Degree of Crystallinity (%) |
|---|---|---|---|
| Example 1 | Quenched from 400° C. to 30° C. | −190 | 29 |
| Example 2 | Quenched from 400° C. to 160° C. and then Left to Cool to 30° C. | −130 | 33 |
| Comparative Example 1 | Left to Cool in Autoclave | −10 | 38 |

TABLE 2

| Example No. | CAI Strength (kg/mm²) | CAI strain at Break Point (μs) |
|---|---|---|
| Example 1 | 35.0 | 7800 |
| Example 2 | 34.0 | 7300 |
| Comparative Example 1 | 28.6 | 5800 |

EXAMPLES 3 AND 4

Composite materials were made in the same procedures as in Example 1 except that the initial cooling rates were set as shown in Table 3. 24 composite sheets were laid up at 0° in the laminate direction. The interlayer energy release coefficients ($G_{1c}$) of the resulting composite materials were measured in accordance with the NASA testing methods. The results are shown in Table 3.

The degree of crystallinity of the PEEK in each composite material was also measured in the same manner as in Example 1 in the central part of the composite material in the thickness direction in which cracking proceeded. The results are shown in Table 3.

COMPARATIVE EXAMPLE 2

Interlayer energy release coefficient ($G_{1c}$) of the composite material of Comparative Example 1 was measured in the same manner as in Example 3. The results are shown in Table 3.

TABLE 3

| No. | Cooling Condition | Initial Cooling Rate (°C./min.) | Degree of Crystallinity (%) | $G_{1c}$ (J/m²) |
|---|---|---|---|---|
| Ex. 3 | Quenched from 400° C. to 30° C. | −435 | 31 | 3240 |
| Ex. 4 | Quenched from 400° C. to 160° C. and then Left to Cool to 30° C. | −272 | 34 | 2460 |
| Comp. | Left to Cool in | −10 | 38 | 1600 |

TABLE 3-continued

| No. | Cooling Condition | Initial Cooling Rate (°C./min.) | Degree of Crystallinity (%) | $G_{1c}$ (J/m$^2$) |
|---|---|---|---|---|
| Ex. 2 | Autoclave | | | |

As indicated above, the composite materials of the present invention have high CAI strength, CAI strain at break and high $G_{1c}$. This proves that the composite materials of the present invention have increased toughness.

EXAMPLES 5-7

Plain weave fabric sheets consisting of carbon fibers having an average diameter of 7 μm, and low-molecular weight PEEK fibers made of PEEK having a weight-average molecular weight of $6.5 \times 10^4$ (relative molecular weight based on the molecular weight of polystyrene) and having an average diameter of 30 μm were used for first layers, and high-molecular weight PEEK powder made of PEEK having a weight-average molecular weight of $9.18 \times 10^4$ (average diameter: 100 μm, PEEK 450 P manufactured by ICI) were used for second layers. Each plain weave fabric sheet was uniformly coated with the PEEK powder in an amount of 1.3 mg/cm$^2$ and laminated. Incidentally, the number of layers (first layers + second layers) laminated was 79.

This laminate was introduced into a polyimide film bag and then placed in an autoclave, in which it was heated at 400° C. under 14 kg/cm$^2$ to produce a composite material.

The resulting composite material was reheated to 400° C. while being kept in the polyimide film in an electric oven. After the PEEK resin was melted, the composite material was introduced into a quenching mold. The quenching mold was provided with a path for cooling water to quench it. In this quenching mold, the composite material was cooled at a predetermined rate while applying a certain level of pressure. The resulting composite material had a thickness of about 6.7 mm. Cooling conditions and initial cooling rate for each composite material are shown in Table 4. Incidentally, the initial cooling rate was a value obtained by dividing the decrease in the temperature of the composite material in the mold by the cooling time.

With respect to each of the resulting composite materials, the degree of crystallization of the PEEK resin was measured. Incidentally, the degree of crystallinity of the PEEK resin was a value averaged in the thickness direction. The results are shown in Table 4.

Each composite material was cut to a size of 100 mm × 100 mm to obtain a specimen, and compressive properties (CAI strength and CAI strain at break point) of each specimen were measured in the same manner as in Example 1. The results of the measurements of CAI strength and CAI strain at break point are shown in Table 5.

COMPARATIVE EXAMPLE 3

40 plain weave fabric sheets consisting of carbon fibers and PEEK fibers having a low molecular weight used in Example 5 were laminated without using high-molecular weight PEEK powder, to produce a composite material under the same conditions as in Example 5. The resulting composite material was measured with respect to a degree of crystallization, CAI strength, and CAI strain at break. The results are shown in Tables 4 and 5.

TABLE 4

| Example No. | Cooling Condition | Initial Cooling Rate (°C./min.) | Degree of Crystallinity (%) |
|---|---|---|---|
| Example 5 | Left to Cool in Autoclave | −10 | 38 |
| Example 6 | Quenched from 400° C. to 160° C. and then Left to Cool to 30° C. | −130 | 33 |
| Example 7 | Quenched from 400° C. to 30° C. | −190 | 29 |
| Comparative Example 3 | Left to Cool in Autoclave | −10 | 38 |

TABLE 5

| Example No. | Amount of PEEK Powder (mg/cm$^2$) | CAI Strength (kg/mm$^2$) | CAI strain at Break Point (μs) |
|---|---|---|---|
| Example 5 | 1.3 | 35.5 | 7700 |
| Example 6 | 1.3 | 40.7 | 9100 |
| Example 7 | 1.3 | 37.5 | 8400 |
| Comparative Example 3 | — | 28.6 | 5800 |

EXAMPLES 8-10

Composite materials were produced in the same procedures as in Example 5, except that the orientations of all fibers in the composite material were 0°, and that the cooling conditions and initial cooling rate of the composite material were as shown in Table 6. The interlayer energy release coefficients ($G_{1c}$) of the composite materials were measured in accordance with the NASA testing methods. The results are shown in Table 6.

COMPARATIVE EXAMPLE 4

Interlayer energy release coefficient ($G_{1c}$) of the composite material of Comparative Example 3 was measured in the same manner as in Example 8. Incidentally, the degree of crystallinity of the PEEK resin was measured in a center portion of each composite material with respect to the thickness direction. The results are shown in Table 6.

TABLE 6

| No. | Cooling Condition | Initial Cooling Rate (°C./min.) | Degree of Crystallinity (%) | $G_{1c}$ (J/m$^2$) |
|---|---|---|---|---|
| Ex. 8 | Left to Cool in Autoclave | −10 | 38 | 2000 |
| Ex. 9 | Quenched from 400° C. to 160° C. and then Left to Cool to 30° C. | −272 | 34 | 2700 |
| Ex. 10 | Quenched from 400° C. to 30° C. | −435 | 31 | 3200 |
| Comp. Ex. 4 | Left to Cool in Autoclave | −10 | 38 | 1600 |

As indicated above, the composite materials of the present invention have improved CAI strength, CAI strain at break and interlayer energy release coefficient ($G_{1c}$). Particularly, when the degree of crystallization of the PEEK resin is controlled to 34% or less, the composite material shows extremely improved CAI strength and $G_{1c}$.

Since the thermoplastic composite material according to another embodiment of the present invention is constituted by first layers such as plain weave fabric sheets consisting of fibers made of low-molecular weight PEEK resins and reinforcing fibers, and second layers such as PEEK powder having a high molecular weight, the reinforcing fibers are well impregnated with PEEK resins, and the toughness of the composite material is improved by the high-molecular weight PEEK resin. Particularly, by controlling the degree of crystallization of the PEEK resin to a low level by adjusting the cooling rate in the process of cooling the composite material, the composite material can show excellent toughness.

Such thermoplastic composite materials are very suitable for various machine parts such as automobile parts, etc., and structural materials.

What is claimed is:

1. A thermoplastic composite material having improved toughness, comprising a laminate constituted by first layers consisting of reinforcing fibers and poly(ether ether ketone) fibers having a low molecular weight, and second layers consisting of poly(ether ether ketone) having a high molecular weight, said laminate being compressed while heating.

2. The thermoplastic composite material according to claim 1, wherein said high-molecular weight poly(ether ether ketone) is in the form of powder, film, woven fabric or non-woven fabric.

3. The thermoplastic composite material according to claim 1, wherein the amount of said high-molecular weight poly(ether ether ketone) is 5–55% by weight based on said low-molecular weight poly(ether ether ketone).

4. The thermoplastic composite material according to claim 1, wherein the degree of crystallization of said poly(ether ether ketone) is controlled to 34% or less by quenching said composite material at an initial cooling rate of 100° C./min or more after thermal formation.

5. The thermoplastic composite material according to claim 1, wherein the low molecular weight poly(ether ether ketone) fibers have a weight-average molecular weight of $6.5 \times 10^4$–$8.3 \times 10^4$ and the high molecular weight poly(ether ether ketone) has a weight-average molecular weight of $9.0 \times 10^4$–$9.4 \times 10^4$.

* * * * *